Dec. 8, 1964 G. V. BARDET 3,160,483
GAS CONTACT OF CONVEYED PARTICULATE SOLIDS
Filed April 6, 1959 6 Sheets-Sheet 1
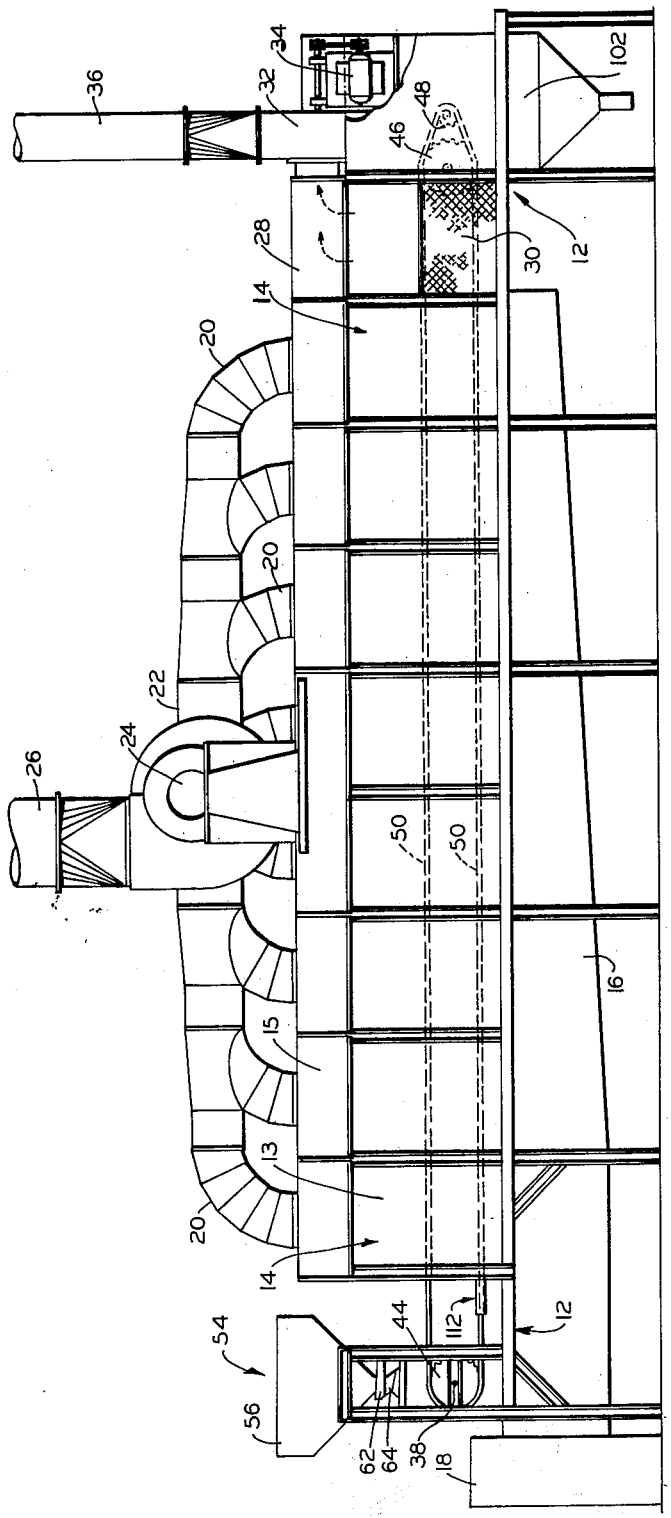
FIG_1
INVENTOR.
GEORGE V. BARDET
ECKHOFF & SLICK
ATTORNEYS
BY
A MEMBER OF THE FIRM

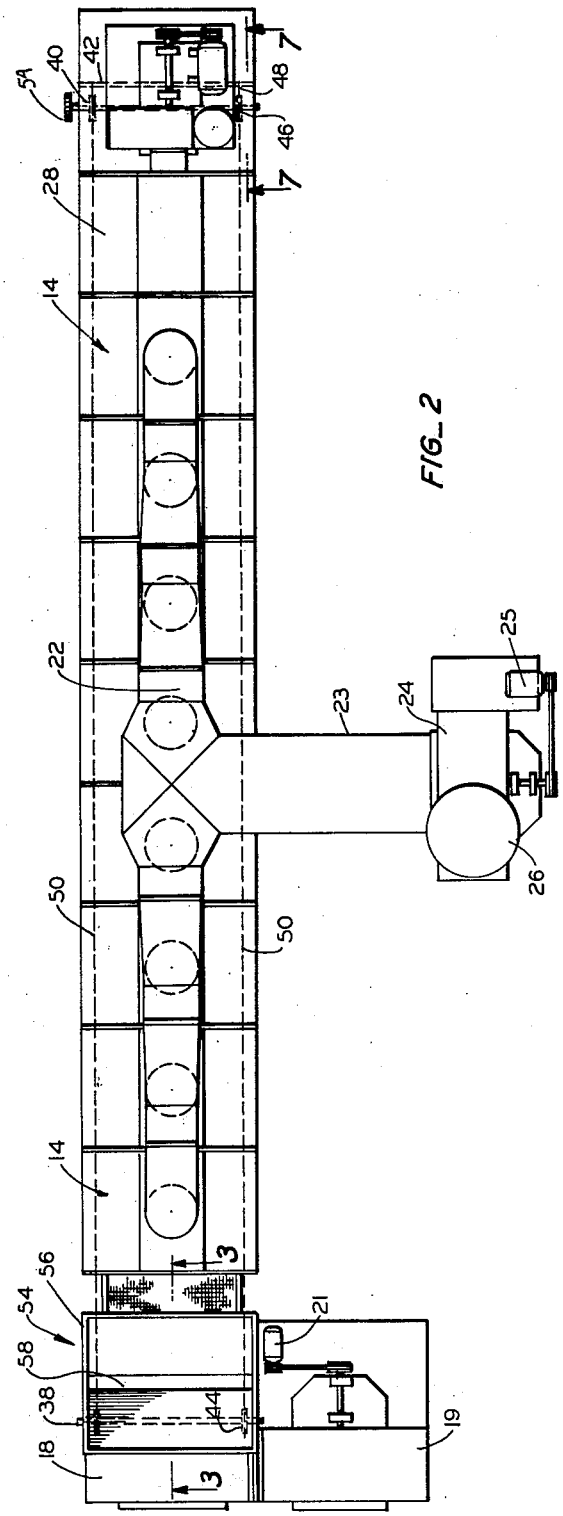

Dec. 8, 1964  G. V. BARDET  3,160,483
GAS CONTACT OF CONVEYED PARTICULATE SOLIDS
Filed April 6, 1959  6 Sheets-Sheet 3
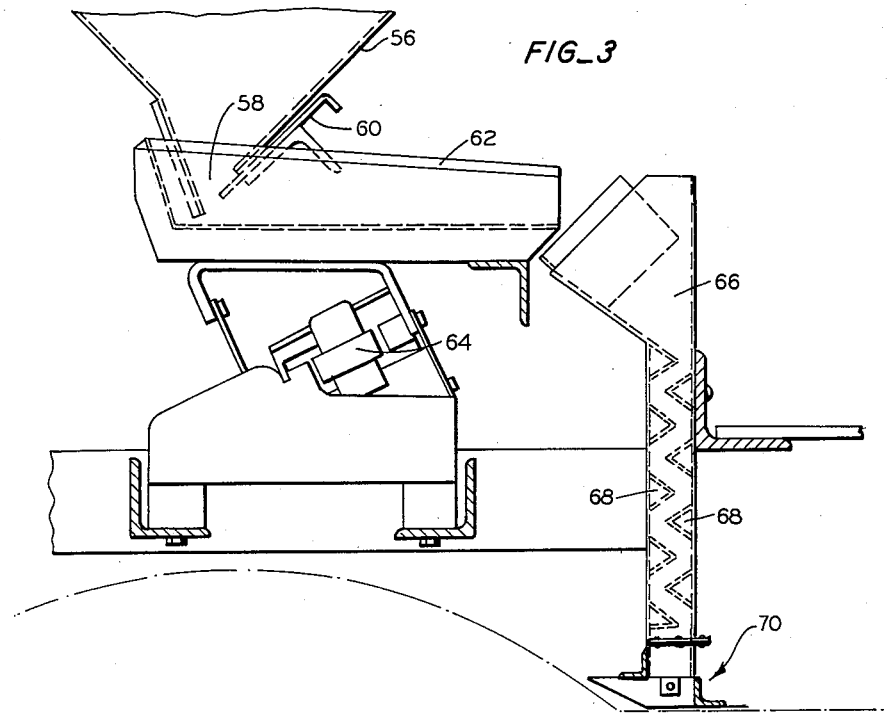
FIG_3
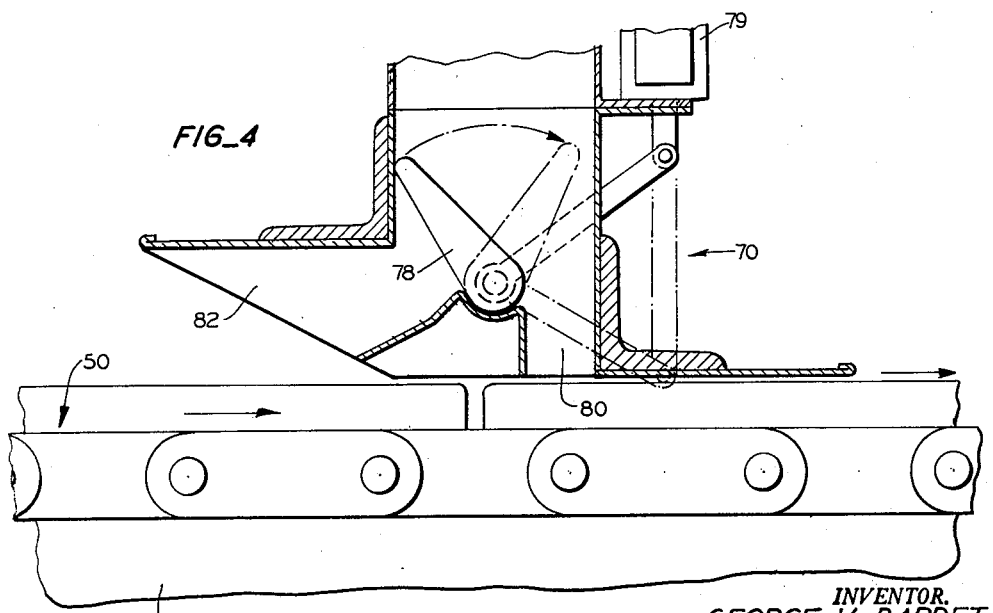
FIG_4
INVENTOR.
GEORGE V. BARDET
ECKHOFF & SLICK
ATTORNEYS
BY
A MEMBER OF THE FIRM

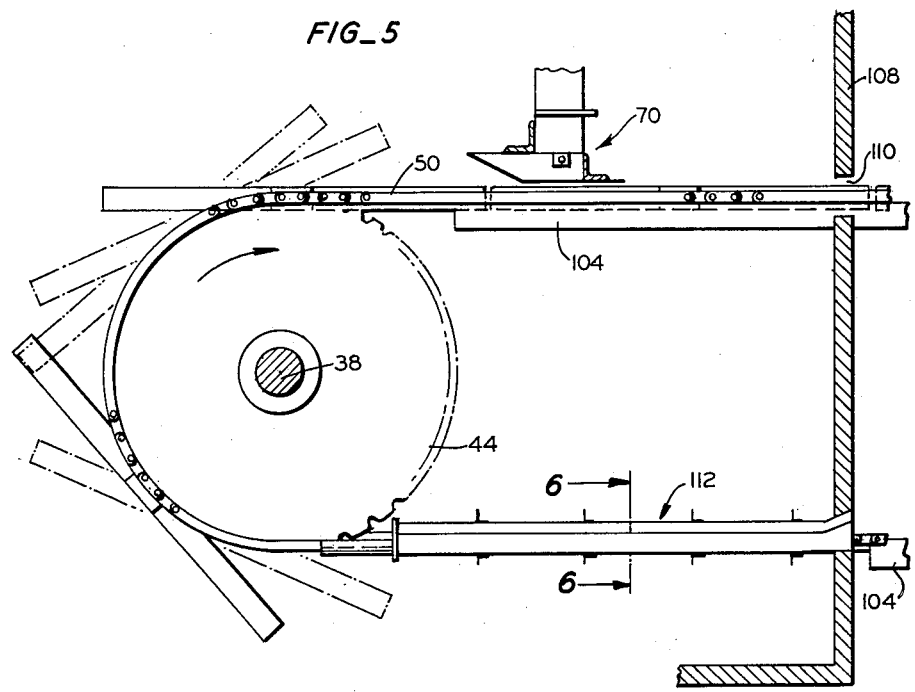
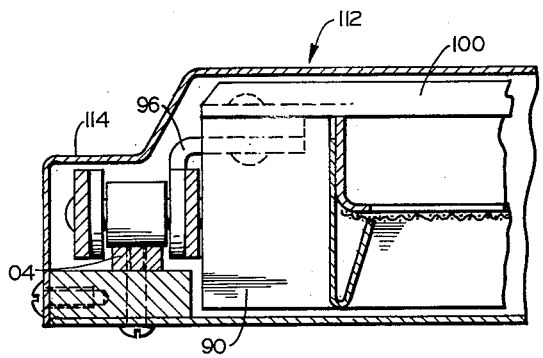

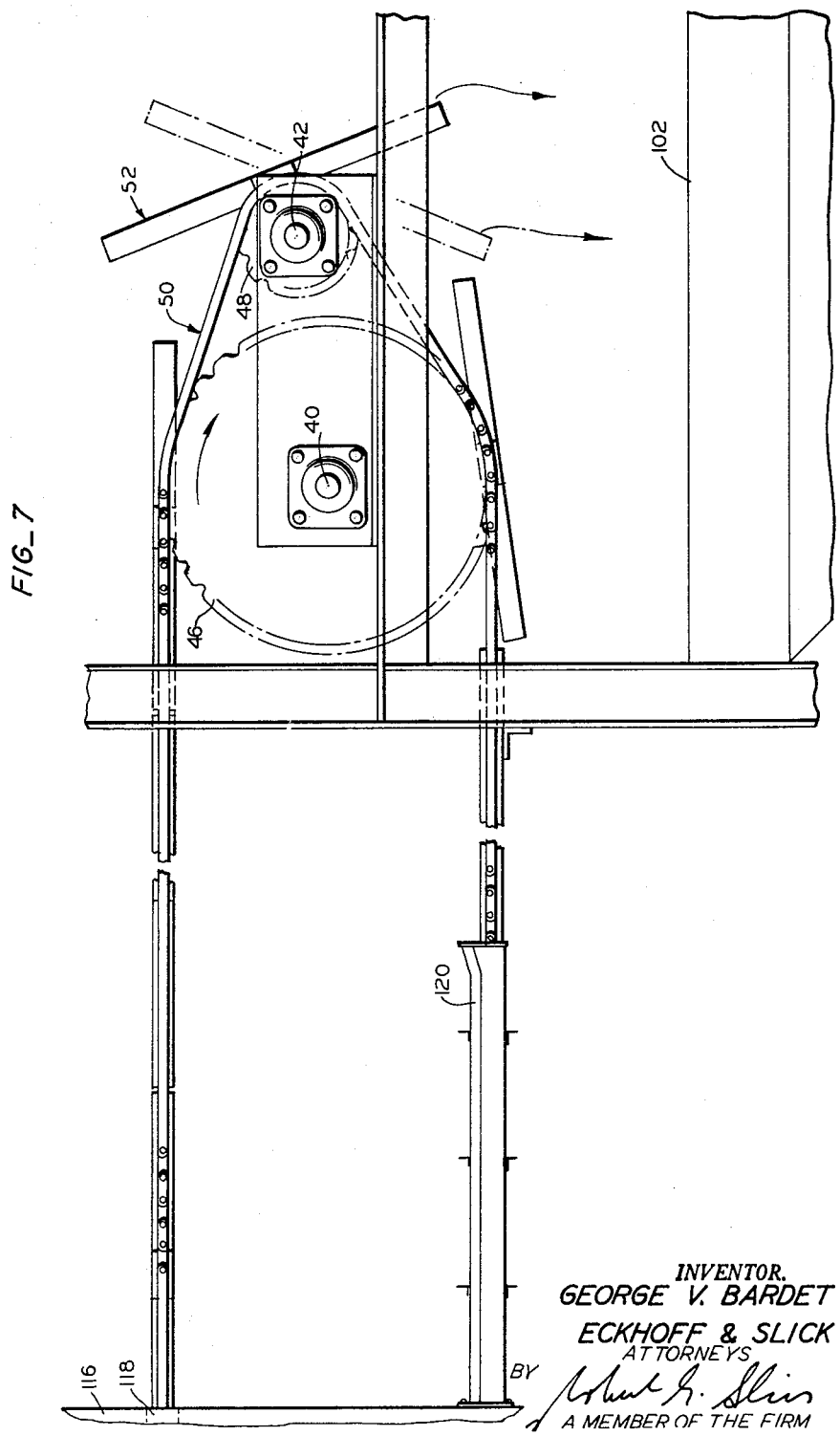

Dec. 8, 1964  G. V. BARDET  3,160,483
GAS CONTACT OF CONVEYED PARTICULATE SOLIDS
Filed April 6, 1959  6 Sheets-Sheet 6
FIG_8
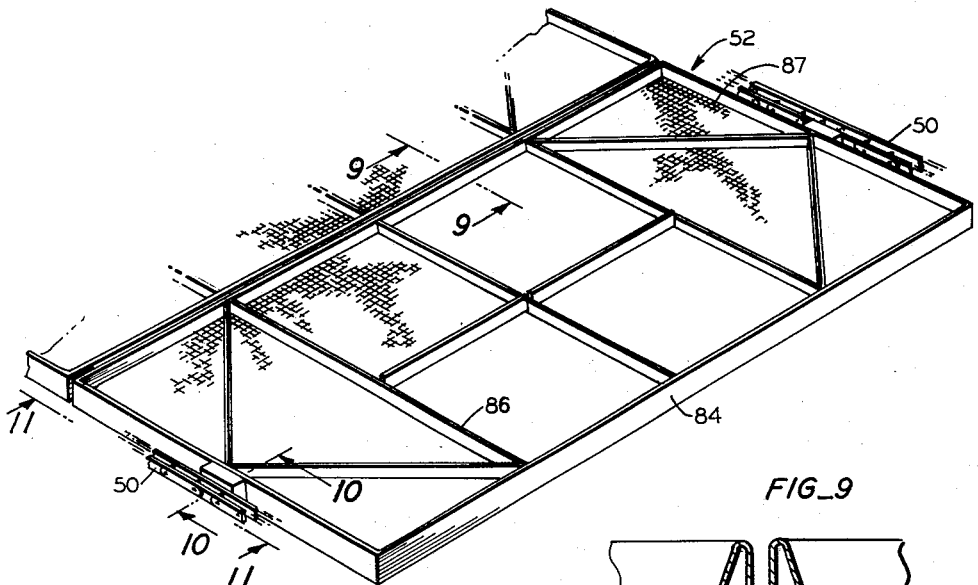
FIG_9
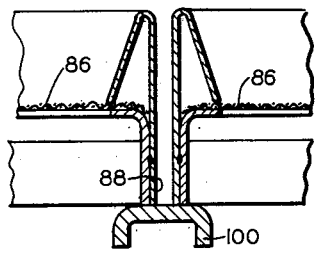
FIG_10
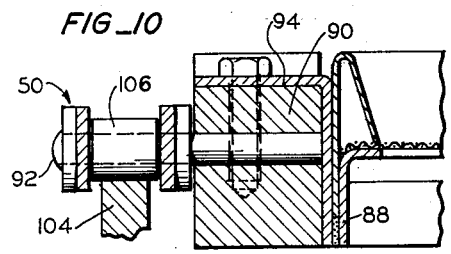
FIG_11
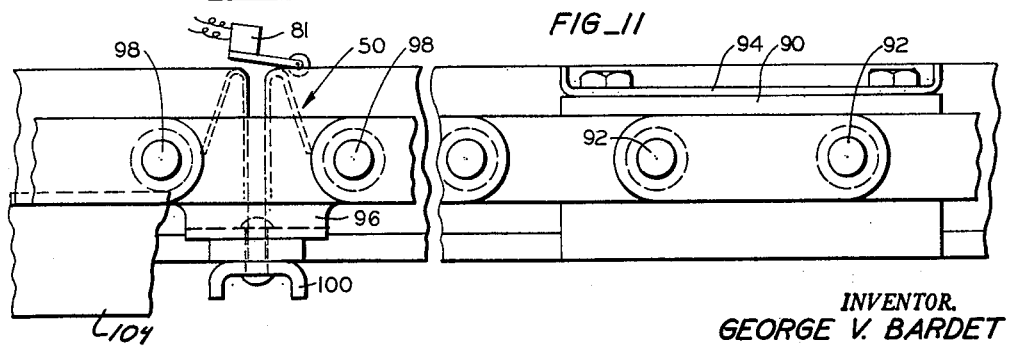
INVENTOR.
GEORGE V. BARDET
ECKHOFF & SLICK
ATTORNEYS
BY
A MEMBER OF THE FIRM

United States Patent Office 3,160,483
Patented Dec. 8, 1964

3,160,483
GAS CONTACT OF CONVEYED PARTICULATE
SOLIDS
George V. Bardet, Berkeley, Calif., assignor to
M.J.B. Co., a corporation of Delaware
Filed Apr. 6, 1959, Ser. No. 804,189
1 Claim. (Cl. 34—236)

This invention relates to a machine for passing air through solid materials which are in the form of discrete particles and more specifically is an improvement on the machine disclosed and claimed in my Patent 2,865,109.

In my prior patent a machine was disclosed wherein gas was brought into contact with a finely divided particulate substance wherein the material was first subjected to a flow of hot gas and was then rapidly cooled. Said invention provided an apparatus whereby all material passed therethrough was uniformly treated, i.e., each particle was subjected to uniform conditions of time, temperature and air flow. Further, said machine provided a device having a high degree of reproducibility so that large numbers of lots of material could be treated with the assurance that all would be subjected to exactly the same conditions.

It is an object of the present invention to provide a machine having all of the desirable attributes of the machine of my prior patent.

A further object of this invention is to provide a machine of simplified construction which operates substantially without reciprocating parts and wherein the material to be treated is moved in a straight, continuous path.

Another object of this invention is to provide a treating machine of the class described wherein a series of perforated mesh screen trays move in one direction through the machine serving as a conveyor for the material under treatment and move in the reverse direction serving as an air diffusion means for the air before it is passed through the material to be treated.

Another object of this invention is to provide a treating device wherein the treating area is fully occupied by trays of material being treated so that no air is wasted by passage between trays.

Another object of this invention is to provide a treating device of the class described wherein a series of trays are filled and means prevents material from getting between adjacent trays.

Another object of this invention is to provide a treating machine of the class described having a simple and effective discharge mechanism.

Other objects will be apparent from the balance of the specification.

In the drawings:

FIGURE 1 is a side view of a machine embodying the present invention.

FIGURE 2 is a plan view of the machine shown in FIGURE 1.

FIGURE 3 is a side view, partly in section of the mechanism for feeding the material onto the trays on the line 3—3 of FIGURE 2.

FIGURE 4 is an enlarged detail view in section of the lower portion of FIGURE 3 showing the mechanism by which material is prevented from passing between two adjacent trays.

FIGURE 5 is a side sectional view of the inlet end of the machine.

FIGURE 6 is a partial sectional view on line 6—6 of FIGURE 5.

FIGURE 7 is a view of the discharge mechanism of the machine on the line 7—7 of FIGURE 2.

FIGURE 8 is a perspective view of one of the trays used to convey material through the machine.

FIGURE 9 is a section on line 9—9 of FIGURE 8.

FIGURE 10 is a section on the line 10—10 of FIGURE 8.

FIGURE 11 is an enlarged side elevation from point 11 of FIGURE 8.

Turning now to a description of the machine by reference characters, and referring particularly to FIGURES 1 and 2 the machine is provided with a supporting framework structure, generally designated 12 having mounted thereon an elongated chamber 14 having removable side walls 13 and top 15. Mounted under the chamber 14 is a tapered airduct 16 which is in free communication with the chamber 14. Mounted at one end of the airduct 16 is a suitable heater 18 for heating air to the desired treatment temperature. The heater 18 receives air from the blower 19 which is driven by the motor 21. Mounted above the chamber 14 is a series of air outlet ducts 20 which lead to a header 22 which is connected to pipe 23 which in turn leads to a suction fan 24 driven by motor 25 which fan has a discharge outlet 26. Thus, the chamber 14 receives air from blower 19 and air is drawn therefrom by the suction fan 24; in this way a strong current of air is produced through the chamber 14.

At the discharge end of the chamber 14, and in partial communication therewith, as is later described in detail, is a second chamber 28 generally like the chamber 14 except that the lower portion thereof as at 30 is made of an air permeable mesh rather than having the solid walls of the chamber 14. A suction fan 32 driven by a suitable motor 34 draws fresh or ambient air through the mesh 30 to cool the material in the trays and discharges it through a stack 36.

Mounted for rotation on the framework are three shafts designated 38, 40 and 42. Each of these shafts has a pair of sprockets designated 44, 46 and 48, respectively. The sprockets 44 and 46 are of the same size while the sprockets 48 are considerably smaller in size as will be later explained in detail. Around each of the two sets of sprockets formed by the sprockets 44, 46 and 48 on each side of the machine is trained an endless chain, each of which has been designated 50. The chains 50 carry between them a series of trays 52 and pass through the chambers 14 and 28. The exact construction of the trays 52 and their manner of fastening to the chains 50 will be hereinafter described in detail. The shaft 40 is provided with a drive wheel 54 to which is connected a suitable motor, not shown so that the shaft can be rotated. As the shaft 40 rotates, an endless procession of trays is pulled through the chamber 14, into the chamber 28, over the sprockets 46 and 48, back into the chamber 28, then into the chamber 14 and then over the sprockets 44 for a repetition of the path of travel.

For the purpose of feeding the particulate material onto the trays, a feeder, is provided which is shown in FIGURES 1 and 2 and shown in detail in FIGURES 3 and 4. The feeder has a hopper 56 for receiving a suitable quantity of material and has an opening 58 at the bottom thereof. The opening 58 is provided with a sliding gate 60 so that the flow from the hopper 56 may be controlled to any desired degree. Material passing through the opening 58 falls onto the vibrating table 62 which is provided with an electromechanical vibrator 64 the purpose of which is to distribute the material evenly. The material passes from the vibrating table 64 onto the feed distributor 66. The feed distributor, which extends for the width of the machine has a series of baffles 68 therein which slow the fall of the material and thus prevent it from bouncing on the trays. The material then falls through the diverter gate mechanism generally designated 70. The function of the diverter gate mechanism is to prevent any of the material from falling between two adjacent trays. The bottom of the diverter gate mechnism has two discharge openings 80 and 82. Normally the diverter gate 78 is in the position shown in solid line so that the material will be discharged from the opening 0. However, at the time a tray edge approaches the opening 80, the gate 78 is moved to the position shown in dot-dash lines, whereupon the material is discharged from the opening 82; as soon as the space between trays has passed from under the opening 82, the gate is restored to the position shown in solid lines. The gate 78 is actuated by the solenoid 79 which is energized by a microswitch 81 (FIGURE 11) which contacts the tray edges; this may be located at any convenient point in the line. By the use of the mechanism described, an even layer of the particulate material is spread onto the bottom of each of the trays and no material is permitted to fall between adjacent trays.

The trays generally designated 52 and which are shown in FIGURES 3, 9, 10 and 11 have a rectangular frame, preferably of stainless steel 84. In addition to the frame proper, suitable bracing 86 is employed to keep the bottom of the tray substantially flat. The bottom of the tray is covered with a suitable mesh 87 the size of which is selected to retain the material under treatment. The edges of the tray are preferably rounded as is shown in FIGURE 9 and 10, particularly if a food product is being handled. The edges of the tray extend downward as at 88 forming a solid support for the trays. The trays 52 are supported between the chains 50 by attaching the center of the tray to two adjacent link pins on each chain. The fastening is achieved by attaching a block 90 between two adjacent pins 92 on the chain 50 and to this block bolting a U-shaped member 94 which is welded to the side of the tray. Thus the trays are held rigidly by two adjacent pins of the roller chain but only at the center of the tray. To support the edges of adjacent trays, a member 96 is attached to two adjacent pins 98. To this member 96 is attached a U-shaped bar 100 which extends the width of the path of travel and is fastened to another member corresponding to 96 on the opposite chain. The edges of the tray 88 therefore ride on the bar 100 as is shown in FIGURE 9 but are not physically attached thereto. The bar 100 serves as an air seal between trays while the trays are traveling in a horizontal path, but does not prevent the free turning of the trays at the ends of the path of travel.

In FIGURE 5 there is shown the path of travel, partly in dot-dash lines, of the trays at the entrance end of the machine. Note that during turning, the trays are held only near the center thereof and are completely free from the U-shaped bars 100. At the discharge end of the machine, a somewhat different system is used since it is desired that the trays be given a sudden turning movement in order that the content of the trays will be discharged as close as possible to a desired point. For this purpose, the auxiliary sprocket 48 (FIGURE 7) is employed which is much smaller than the sprockets 44 and 46. As is shown in FIGURE 7, the tray is given a rapid turning movement so that the contents are rapidly discharged into the hopper 102 while passing over the sprocket 48.

To support the trays as they pass through the machine, the machine has two pairs of rails 104 upon which the rollers 106 of the chain ride. Thus, the trays are kept substantially level throughout their path of travel in both directions through the machine.

To prevent loss of air at the discharge and inlet ends as well as to prevent mixing between the chambers 14 and 28, certain baffles and tunnels are employed. At the entrance of the machine, as the trays pass into the chamber 14 (see FIGURE 5), the front wall of the chamber 108 has only a small opening 110 therein which barely allows the tray to clear so that there is little loss. No special precaution is necessary at this point since most of the air would have passed through a tray and therefore would be discharged into the atmosphere anyway. To prevent loss of air which has been freshly heated, and to aid in maintaining a slight negative air pressure within the machine, the exiting path as shown in FIGURE 5 is provided with a tunnel 112 since it is more important that the freshly heated air be retained in the machine to prevent loss. The tunnel 112 is shown in FIGURE 6 and merely consists of an elongated tubelike structure having walls 114 which conform as closely as possible to the shape of the chain and the trays carried thereby, creating a long narrow passage through which little air is lost. Similarly, at the discharge end, the wall 116 separating chamber 14 from chamber 28 has only a small opening 118 therein and the tray entry is provided with a tunnel 120 which is of exactly the same configuration as the tunnel 112.

The machine thus described is capable of treating a particulate material under conditions whereby the material is first subjected to a blast of hot air and is then rapidly cooled and discharged into a suitable container. The machine is almost completely free of reciprocating parts and requires a minimum of maintenance and supervision.

I claim:

A machine of the class described comprising a first elongated chamber having a tapered duct located under said chamber; a second chamber having means for drawing cool air upwardly therethrough, said first and second chambers being adjacent to each other forming a long continuous chamber; a pair of parallel endless chains wholly within said long continuous chamber, each of said chains being supported by main sprockets at opposite ends of the long continuous chamber, one end of said long continuous chamber being designated the filling end and one end being designated the discharge end, said pair of parallel chains supporting therebetween a series of trays having perforated bottoms, said trays moving in one direction forming an upper path and moving in the opposite direction forming a lower path; means for filling trays on said upper path; means for propelling said endless chains through said long continuous chamber; suction means for drawing hot air through said duct and upwardly through said trays whereby the lower trays act as an air-diffusion means for the air before it is passed through the material on said upper trays; and auxiliary sprockets over which the chains pass at the discharge end of said long continuous chamber, said auxiliary sprockets being of small diameter whereby the trays are given a sudden turning movement as they pass over the auxiliary sprockets.

References Cited in the file of this patent

UNITED STATES PATENTS

| | | |
|---|---|---|
| 1,339,092 | Benjamin | May 4, 1920 |
| 1,680,441 | Adams | Aug. 14, 1928 |
| 1,789,018 | Opitz | Jan. 13, 1931 |
| 2,107,274 | Anderson | Feb. 8, 1938 |
| 2,157,775 | Smith | May 9, 1939 |
| 2,490,176 | Tomlinson et al. | Dec. 6, 1949 |
| 2,668,366 | Barnett | Feb. 9, 1954 |
| 2,865,109 | Bardet | Dec. 23, 1958 |

FOREIGN PATENTS

| | | |
|---|---|---|
| 733,073 | Germany | Mar. 18, 1943 |